United States Patent
Poo et al.

(10) Patent No.: US 8,316,160 B2
(45) Date of Patent: Nov. 20, 2012

(54) NON-VOLATILE MEMORY DEVICE WITH USB AND WIRELESS CONNECTIVITY AND METHOD FOR CONTROLLING THE CONNECTIVITY

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 571 days.

(21) Appl. No.: 12/373,672

(22) PCT Filed: Jul. 13, 2006

(86) PCT No.: PCT/SG2006/000197
§ 371 (c)(1),
(2), (4) Date: Jan. 13, 2009

(87) PCT Pub. No.: WO2008/008040
PCT Pub. Date: Jan. 17, 2008

(65) Prior Publication Data
US 2009/0313434 A1    Dec. 17, 2009

(51) Int. Cl.
G06F 13/12    (2006.01)
G06F 13/38    (2006.01)
G06F 3/00     (2006.01)
G06F 5/00     (2006.01)
G06F 13/00    (2006.01)
G06F 13/14    (2006.01)

(52) U.S. Cl. ............. 710/36; 710/74; 710/110; 711/115
(58) Field of Classification Search ...................... 710/36
See application file for complete search history.

(56) References Cited

U.S. PATENT DOCUMENTS

| 2002/0032786 A1 | 3/2002 | Yamada et al. | |
|---|---|---|---|
| 2004/0073727 A1* | 4/2004 | Moran et al. | 710/74 |
| 2006/0026348 A1 | 2/2006 | Wallace et al. | |
| 2006/0149895 A1 | 7/2006 | Pocrass | |
| 2006/0179144 A1* | 8/2006 | Nagase | 709/226 |
| 2007/0175994 A1 | 8/2007 | Fruhauf | |

FOREIGN PATENT DOCUMENTS

| CN | 1475889 | 2/2004 |
|---|---|---|
| EP | 1513098 | 3/2005 |
| JP | 2002-55729 | 2/2002 |
| JP | 2005-78651 | 3/2005 |

(Continued)

OTHER PUBLICATIONS

Notice of Preliminary Rejection of Korean Application No. 10-2009-7002772, Jan. 13, 2011. (English Translation).

(Continued)

Primary Examiner — Chun-Kuan Lee
Assistant Examiner — Brooke Taylor
(74) Attorney, Agent, or Firm — SNR Denton US LLP

(57) ABSTRACT

A non-volatile memory device having a USB connector with a USB controller, and a wireless antenna with a wireless controller. The USB controller and the wireless controller are both operatively connected to the non-volatile memory. When the non-volatile memory device is operatively connected to a host using the USB connector, the USB controller has priority over the wireless controller for read from, and write to, functions with the non-volatile memory. A corresponding method is also disclosed.

15 Claims, 2 Drawing Sheets

FOREIGN PATENT DOCUMENTS

WO          2005122711        12/2005
WO    WO 2005/122711         12/2005

OTHER PUBLICATIONS

Japanese Patent Office Action corresponding to Japanese Serial No. 2009-519414 dated Sep. 27, 2011.

European Search Report dated Jun. 29, 2011 corresponding to European Serial No. 06769680.7.
Chinese Office Action dated May 31, 2011 corresponding to Chinese Serial No. 200680055330.4.

* cited by examiner

000
NON-VOLATILE MEMORY DEVICE WITH USB AND WIRELESS CONNECTIVITY AND METHOD FOR CONTROLLING THE CONNECTIVITY

CROSS-REFERENCE TO OTHER APPLICATIONS

This is a National Phase of International Application No. PCT/SG2006/000197 filed on Jul. 13, 2006.

FIELD OF THE INVENTION

This invention relates to a non-volatile memory device with USB and wireless connectivity and to a method for controlling the connectivity.

BACKGROUND TO THE INVENTION

Non-volatile memory devices with USB connectivity are well known. They are often used as easily-carried storage devices, MP3 players, for transferring data, for storing image date, and so forth. They can use their USB connector to interface with any host having a USB port such as, for example, a digital camera, MP3 player, personal digital assistant, personal computer, portable computer, printers, projectors, television receivers, radios, and so forth.

The introduction of wireless connectivity to such a device creates problems on how to resolve the competing requirements for access to the non-volatile memory by the two different connection systems.

SUMMARY OF THE INVENTION

In accordance with a first preferred aspect there is provided a non-volatile memory device having a USB connector and a USB controller, and a wireless antenna and a wireless controller. The USB controller and the wireless controller are both operatively connected to the non-volatile memory. When the non-volatile memory device is operatively connected to a host using the USB connector, the USB controller has priority over the wireless controller for read from, and write to, functions with the non-volatile memory.

In accordance with a second preferred aspect there is provided a non-volatile memory device comprising:
a USB connector and a USB controller,
a wireless antenna and a wireless controller,
the USB controller and the wireless controller both being operatively connected to the non-volatile memory;
wherein when in use and the USB connector is operatively connected to a host, the wireless controller sends all commands to the USB controller and when in use and the USB connector is not operatively connected to the host, the wireless controller sends all commands directly to a file allocation table of the non-volatile memory.

According to a third preferred aspect there is provided a method for controlling access to a non-volatile memory of a non-volatile memory device having a USB connector, the access being by a USB controller and a wireless controller of the non-volatile memory device. The method comprises: providing priority for the USB controller over the wireless controller for read from, and write to, functions with the non-volatile memory when the non-volatile memory device is operatively connected to a host using the USB connector.

According to a fourth preferred aspect there is provided a method for controlling access to a non-volatile memory of a non-volatile memory device having a USB connector, the access being by a USB controller and a wireless controller of the non-volatile memory device, the method comprising:
when the USB connector is operatively connected to a host, the wireless controller sends all commands to the USB controller and when the USB connector is not operatively connected to the host, the wireless controller sends all commands directly to a file allocation table of the non-volatile memory.

For all aspects any command of the wireless controller for the non-volatile memory may pass through the USB controller. The wireless controller may be operatively connected to the USB controller via an interface for enabling the USB controller to control, communicate with and respond to requests from the wireless controller. The interface may comprise a first interface that forms a part of the USB controller and a second interface that forms a part of the wireless controller. The second interface may be for converting wireless protocol communications for enabling them to be read by the USB controller. The conversion may be to a USB protocol. The first interface may be for converting USB protocol communications for enabling them to be read by the wireless controller. The conversion may be to a wireless protocol.

The USB controller and the wireless controller have a master:slave relationship with the USB controller as the master and the wireless controller as the slave. The USB controller may be able to be enumerated as a local drive, and the wireless controller may be able to be enumerated as a network drive. A file allocation table may be able to be regularly updated to accord to the priority of the controllers. The wireless controller may be unable to access the non-volatile memory if the USB controller is accessing the memory. The USB controller may be unable to access the non-volatile memory if the wireless controller is accessing the non-volatile memory. When in use the USB connector is not operatively connected to the host, the wireless connector may be able to operate independently of the USB controller.

For the second aspect the USB controller may check to determine of the wireless controller is accessing the non-volatile memory before commencing to access the non-volatile memory and, if the wireless controller is accessing the non-volatile memory the USB controller waits for a conclusion of a command of is the access by the wireless control before commencing to access the non-volatile memory.

The non-volatile memory device may be able to be used to enable a host device that is not wireless-enabled to send data wirelessly. In such a case the non-volatile memory may act as a sham memory.

The wireless controller may check to determine if the non-volatile memory is able to receive a new command before accessing the non-volatile memory, the check being made at the USB controller and, if the USB controller has access to the non-volatile memory the wireless controller waits until the access by the USB controller has concluded before accessing the non-volatile memory.

BRIEF DESCRIPTION OF THE DRAWINGS

In order that the present invention may be fully understood and readily put into practical effect there shall now be described by way of non-limitative example only a preferred embodiment of the present invention, the description being with reference to the accompanying illustrative drawings.

In the drawings.

DETAILED DESCRIPTION OF THE PREFERRED EMBODIMENT

Figure 1:
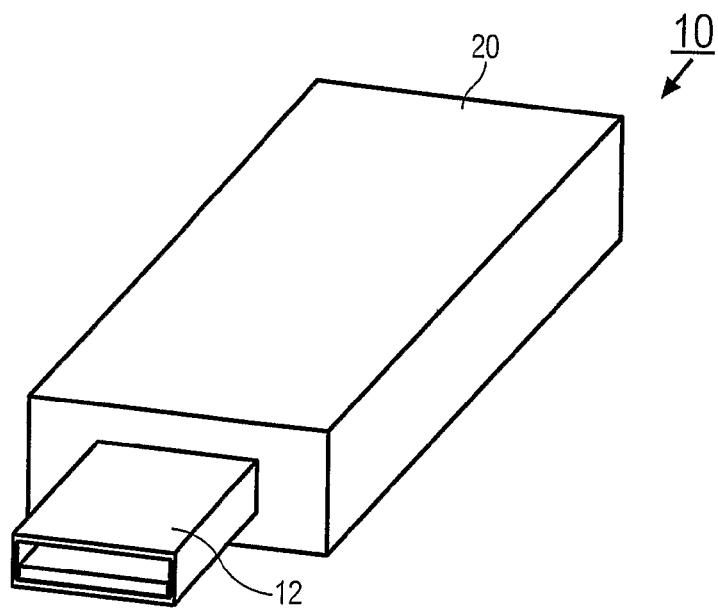
FIG. 1 is a perspective view of a preferred embodiment of a non-volatile memory device with USB and wireless connectivity.
Figure 2:
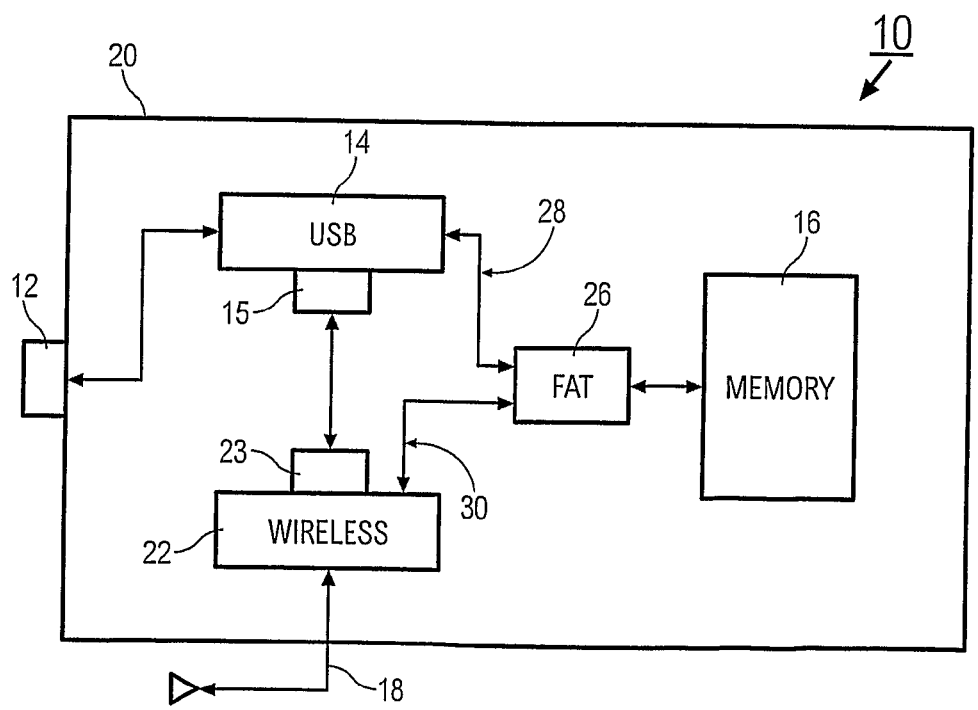
FIG. 2 is a block diagram of the device of FIG. 1.

To refer to FIGS. 1 and 2, there is shown a non-volatile memory device 10 with a connector 12 configured to accord with the USB standard. The connector 12 has a USB controller 14. In this way data can be downloaded to or uploaded from non-volatile memory 16 using the USB connector 12 in the normal manner. The non-volatile memory 16 may be a disc drive and/or flash memory. It may be a single memory device or may be several memory devices.

In addition there is an antenna 18 for wireless connectivity of the device 10 to a host device (not shown). The wireless connectivity may be by any suitable system such as, for example, Bluetooth, WiFi, WiMax, and so forth. The antenna 18 may be built into the device 10 in which case it would be entirely within the casing 20; or may be an additional apparatus for releasable attachment to the device 10 using a suitable connector (not shown). The antenna is controlled by the wireless controller 22. If built-in, the casing should not be made of a metallic or other material that does not transmit wireless signals.

In this way the device 10 can be used in three different modes:

(i) when connected to a host using the USB connector 12 and for the data download or upload to be via the USB connector 12 and the USB controller 14. This is a mode that may be called USB/USB indicating USB connectivity and USB operation;

(ii) when connected to a host using the USB connector 12 and for the data download or upload to be via the antenna 18 and the wireless controller 22. This is a mode that may be called USB/Wireless indicating USB connectivity and wireless operation; and (iii) when connected to a host by the antenna 18 and for all data upload or down load to be via the antenna 18 and wireless controller 22, the USB connector 12 not being connected to a host. This mode may be called Wireless/Wireless indicating wireless connectivity and wireless operation.

In the first two modes, the device 10 has electrical power supplied to the device 10 for the operation of the device 10 by the power lines of the USB connector 12. This power is used for all functions of the device 10 including the operation of the USB controller 14 and the wireless controller 22. In these two modes the presence of the power supplied by the connector 12 may be used as an indicator that the device 10 is to operate in one of these two modes.

In the third mode, electrical power for the operation of the device 10 is provided by the EMF generated across antenna 18 and/or a battery in the device 10. This power is used for the operation of the device 10 except for the operation of the USB controller 14. In this mode, the lack of power supplied by the connector 12 may be used as an indicator that the device 10 is to operate in this mode, and that there is, and should be, no power supplied to the USB controller 14. As such, the wireless controller 22 can operate independently of the USB controller 14.

The memory 16 is operatively connected to and accessible by the USB controller 14 as well as the wireless controller 22. In the first two modes, the USB controller 14 will have a higher priority for both read and write functions than the wireless controller 22. This may be done by having a master/slave relationship between the USB controller 14 and the wireless controller 22, with the USB controller 14 being the master and the wireless controller being the slave.

Both the USB controller 14 and the wireless controller 22 are able to write to and read from the memory 16. The USB controller 14 will enumerate as a local drive and therefore the host connected to it will have a higher priority. The wireless controller 22 will be enumerated as a network drive and thus any host connected wirelessly will be connected through the wireless LAN will be considered as a network drive and thus have a lower priority. Multiple users will be able to connect through the wireless controller 22.

In the first two modes, the wireless controller 22 and the USB controller 14 will be operatively connected via an interface. The interface is constituted by a first interface 15 that forms a part of the USB controller 14, and a second interface 23 that forms a part of the wireless controller 22. However, the two interfaces 15, 23 may be combined into firmware operatively located between the USB controller 14 and the wireless controller 22, if required or desired. The interfaces 15, 23 may be, for example, a Universal Asynchronous Receiver/Transmitter ("UART"), Service Provider Interface ("SPI") or Secure Digital In/Out interface ("SDIO"). By means of the interfaces 15, 23, the USB controller 14 will be able to control, communicate with and respond to requests from the wireless controller 22 as any command of the wireless controller 22 for the memory 16 must pass through the USB controller 14.

The interface 23 is for converting wireless protocol communications to enable them to be read by the USB controller 14. The conversion is to a USB-readable protocol. The interface 15 is for converting USB protocol communications to enable them to be read by the wireless controller 22. The conversion is to a wireless-readable protocol The file allocation table 26 of the memory 16 will be updated at constant intervals but the file allocation table 26 can receive only one input at a time.

Figure 3:
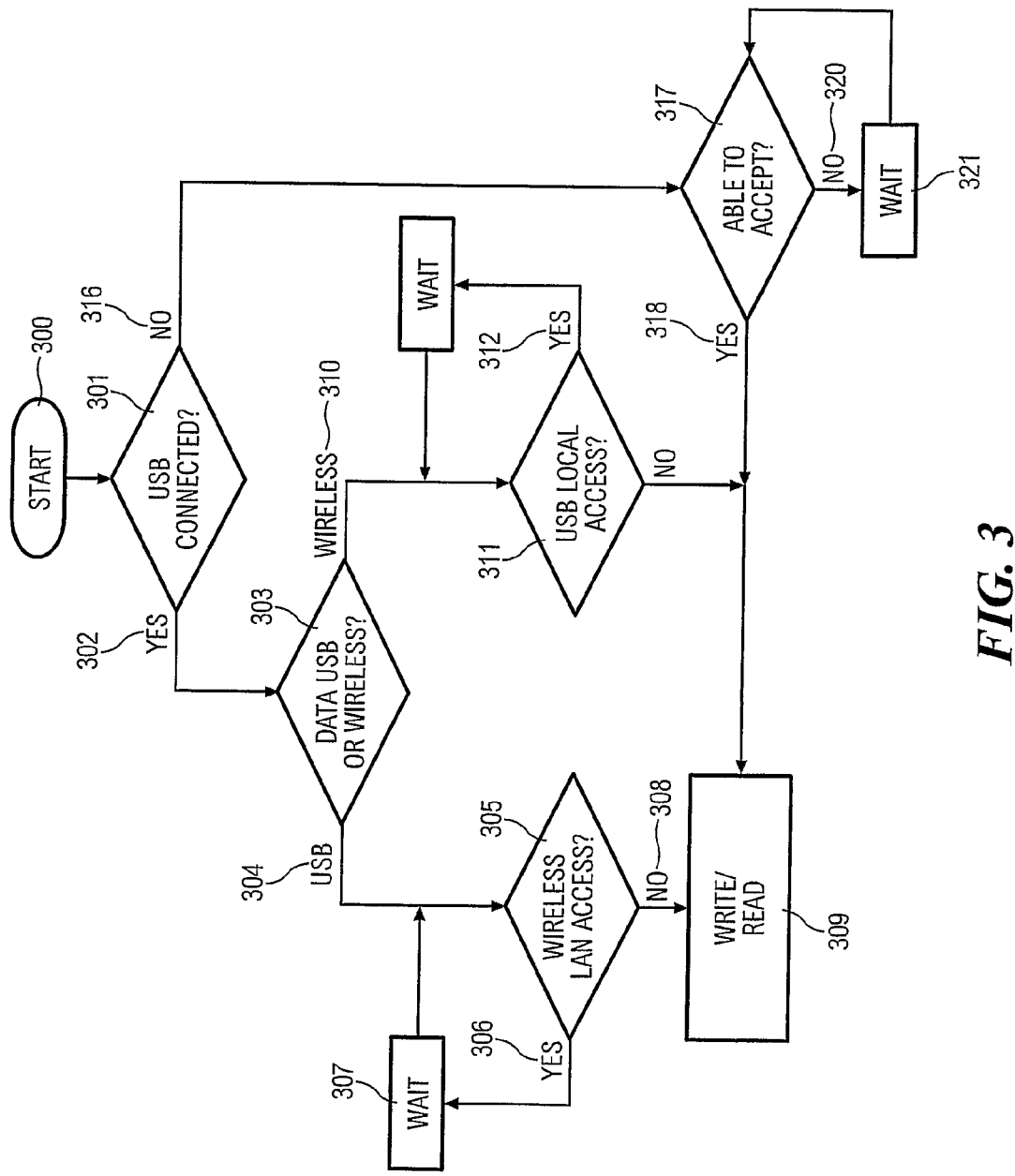
FIG. 3 is a flow chart for the operation of the device of FIGS. 1 and 2.

As shown in FIG. 3, after starting (300), when a command is received it is first determined (301) if the USB connector 12 is connected to a host (not shown) This is determined by the voltage supplied from the host to the USB device 10 through connector 12. If there is a voltage it is assumed that the USB controller is to write data to the memory 16 (302) or to read data from the memory 16. The source of the command is then determined (303). If the command is from the USB controller 14 (304), the USB controller 14 then checks to determine if the wireless controller 22 is accessing the memory 16 (305), preferably by checking for a reading or writing command from the wireless controller 22. If not (308), the USB controller 14 will start to write the data to the memory (309) via the file allocation table 26 and the data line 28. If the wireless controller 22 is accessing the memory 16 (306), the controller 14 will wait (307) for a predetermined time until the read/write command is finished being serviced. It will then service the new command from the USB controller 14 and write the data (309).

If during the write command of the USB controller 14, a read or write command issues from the wireless controller 22, the read or write command from the wireless controller 22 will be rejected by the USB controller 14. After the write command from the USB controller 14 is finished, the file allocation table 26 will be updated to the wireless network drive that is connected through the wireless controller 22.

If at (303) the command is from the wireless controller 22 (310), it passes through the USB controller 14. The USB controller 14 then checks to determine if the wireless controller 22 is accessing the memory 16 (311), preferably by checking for a reading or writing command from the USB controller 14. If not (314), the wireless controller 14 will start to write the data to the memory (309) via the file allocation table 26 and the data line 28. If the USB controller 14 is accessing the memory 16 (312), the wireless controller 22 will wait (313) for a predetermined time until the read/write command is finished being serviced. It will then service the new command from the wireless controller 22 and write the data (309).

In the third mode, when the USB connector 12 is not connected to a host (316), the initial read or write command will be from the wireless controller 22. The wireless controller 22 can therefore bypass the USB controller 14 and directly determine if the memory 16 is able to accept new commands (317). If the memory 16 is able to accept new commands (318), the data is sent to or read from the memory 16 (309) via the data line 30 and the file allocation table 26.

During the read or write command from the wireless controller 22 being serviced, a read or write command from the USB controller 14 will not be serviced and the command will not be able to be serviced until the command from the wireless controller is completed. If the memory 16 is not able to accept new commands (320) due to, for example, the memory 16 being accessed for whatever reason or for whatever function that the memory 16 may be performing, the command will not be allowed by the memory controller. After waiting a predetermined period (321) and when the memory 16 is able to receive new commands, the command will be able to be approved and the data will be sent to or read from the memory 16 through the data line 30 and the file allocation table 26 (309).

The non-volatile memory device may be able to be used to enable a host device that is not wireless-enabled to send data wirelessly. In such a case the non-volatile memory may act as a sham memory.

In this description, and in the drawings, components of the device 10 that are not relevant to the invention have been omitted for simplifying the understanding f the invention. For example, a controller for the non-volatile memory 16 is not described nor illustrated even though one would inherently be required, as would be known to a person skilled in the technology.

Whilst there has been described in the foregoing description a preferred embodiment of the present invention it will be understood by those skilled in the technology concerned that many variations or modifications in details of design or construction may be made without departing from the present invention.

What is claimed is:

1. A non-volatile memory device comprising:
   a USB connector and a USB controller,
   a wireless antenna and a wireless controller,
   the USB controller and the wireless controller both being operatively connected to a non-volatile memory,
   wherein,
      when in use with the USB connector being operatively connected to a host, the wireless controller sends all commands to the USB controller, and when the USB controller receives commands from both the USB connector and the wireless controller, a file allocation table receiving at most one input at a time from one of the USB controller and the wireless controller via the USB controller so as to enable prioritization of the one input of the USB controller over the one input of the wireless controller via the USB controller for read from and write to functions associated with the non-volatile memory, the one input being serviced until completion; and
      wherein when in use with the USB connector not being operatively connected to the host, the wireless controller sends all commands directly to the file allocation table of the non-volatile memory.

2. A non-volatile memory device as claimed in claim 1, wherein any command of the wireless controller for the memory passes through the USB controller; wherein the wireless controller is operatively connected to the USB controller via an interface for enabling the USB controller to control, communicate with and respond to requests from the wireless controller; the interface comprising a first interface that forms a part of the USB controller and a second interface that forms a part of the wireless controller; the first interface being for converting USB protocol communications for enabling them to be read by the wireless controller.

3. A non-volatile memory device as claimed in claim 2, wherein the second interface is for converting wireless protocol communications for enabling them to be read by the USB controller, and the conversion is to a USB protocol.

4. A non-volatile memory device as claimed in claim 1, wherein the USB controller is able to be enumerated as a local drive, and the wireless controller is able to be enumerated as a network drive; the USB controller and the wireless controller having a master:slave relationship with the USB controller as the master and the wireless controller as the slave.

5. A non-volatile memory device as claimed in claim 1, wherein when in use the USB connector is not operatively connected to the host, the wireless connector is able to operate independently of the USB controller; the non-volatile memory device being able to be used for sending data wirelessly when connected to a host that is not enabled with a protocol of the wireless controller.

6. A non-volatile memory device as claimed in claim 1, wherein the wireless controller is unable to access the non-volatile memory if the USB controller is accessing the memory; the USB controller being unable to access the non-volatile memory if the wireless controller is accessing the non-volatile memory.

7. A method for controlling access to a non-volatile memory of a non-volatile memory device having a USB connector, the access being by a USB controller and a wireless controller of the non-volatile memory device, the method comprising:
   when the USB connector is operatively connected to a host, the wireless controller sends all commands to the USB controller, and when the USB controller receives commands from both the USB connector and the wireless controller, a file allocation table receiving at most one input at a time from one of the USB controller and the wireless controller via the USB controller so as to enable prioritization of the one input of the USB controller over the one input of the wireless controller via the USB controller for read from and write to functions associated with the non-volatile memory, the one input being serviced until completion, and
   when the USB connector is not operatively connected to the host, the wireless controller sends all commands directly to the file allocation table of the non-volatile memory.

8. A method as claimed in claim 7, wherein any command of the wireless controller for the memory passes through the USB controller; the wireless controller being operatively connected to the USB controller via an interface and enables the USB controller to control, communicate with and respond to requests from the wireless controller; the interface comprising a first interface that forms a part of the USB controller and a second interface that forms a part of the wireless controller;

the second interface converting wireless protocol communications to enable them to be read by the USB controller; and the conversion being to a USB protocol or a wireless protocol.

9. A method as claimed in claim 8, wherein the first interface converts USB protocol communications for enabling them to be read by the wireless controller.

10. A method as claimed in claim 7, wherein the USB controller is enumerated as a local drive, and the wireless controller is enumerated as a network drive; the USB controller and the wireless controller having a master:slave relationship with the USB controller as the master and the wireless controller as the slave.

11. A method as claimed in claim 7, wherein the USB controller checks to determine of the wireless controller is accessing the non-volatile memory before commencing to access the non-volatile memory and, if the wireless controller is accessing the non-volatile memory the USB controller waits for a conclusion of a command of the access by the wireless controller before commencing to access the non-volatile memory; the wireless controller being unable to access the non-volatile memory if the USB controller is accessing the non-volatile memory; the wireless controller checking to determine if the non-volatile memory is able to receive a new command before accessing the non-volatile memory, the check being made at the USB controller and, if the USB controller has access to the non-volatile memory the wireless controller waits until the access by the USB controller has concluded before accessing the non-volatile memory.

12. A method as claimed in claim 7, wherein the USB controller is unable to access the non-volatile memory if the wireless controller is accessing the non-volatile memory; the non-volatile memory device being used to enable a host device that is not wireless-enabled to send data wirelessly.

13. A method as claimed in claim 7, wherein when in use the USB connector is not operatively connected to the host, the wireless connector operates independently of the USB controller; the non-volatile memory acting as a sham memory.

14. A non-volatile memory device as claimed in claim 1, wherein the USB controller is configured to reject a read or write command received from the wireless controller via the USB controller during a write command from the USB controller.

15. A method as claimed in claim 7, wherein the USB controller is configured to reject a read or write command received from the wireless controller via the USB controller during a write command from the USB controller.

* * * * *